(12) United States Patent
Yoneda et al.

(10) Patent No.: US 8,387,369 B2
(45) Date of Patent: Mar. 5, 2013

(54) STRADDLE-TYPE VEHICLE

(75) Inventors: Yuichi Yoneda, Shizuoka (JP); Mikio Ishimoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 682 days.

(21) Appl. No.: 12/394,525

(22) Filed: Feb. 27, 2009

(65) Prior Publication Data

US 2010/0045014 A1 Feb. 25, 2010

(30) Foreign Application Priority Data

Feb. 29, 2008 (JP) ................................. 2008-050299
Feb. 12, 2009 (JP) ................................. 2009-029485

(51) Int. Cl.
*F01N 3/00* (2006.01)
*F01N 5/04* (2006.01)

(52) U.S. Cl. ........................................... 60/289; 60/319

(58) Field of Classification Search .............. 60/30, 317, 60/319, 324, 289, 293, 280, 781; 180/68.1
See application file for complete search history.

(56) References Cited

U.S. PATENT DOCUMENTS

| | | | |
|---|---|---|---|
| 2,308,059 A * | 1/1943 | Decker ........................ | 239/427.3 |
| 4,354,349 A * | 10/1982 | Otani et al. ..................... | 60/299 |
| 4,417,442 A * | 11/1983 | Ikenoya et al. ................. | 60/293 |
| 4,674,277 A * | 6/1987 | Fujitomi et al. ................ | 60/293 |
| 5,657,628 A * | 8/1997 | Takeuchi ........................ | 60/293 |
| 6,250,076 B1 * | 6/2001 | Kawamata et al. ............. | 60/304 |
| 2007/0079604 A1* | 4/2007 | Macaluso ....................... | 60/289 |

FOREIGN PATENT DOCUMENTS

| | | | |
|---|---|---|---|
| JP | 06-272551 A | * | 9/1994 |
| JP | 2006-183513 A | | 7/2006 |

OTHER PUBLICATIONS

Machine translation of JP06-272551A.*

* cited by examiner

*Primary Examiner* — Thomas Denion
*Assistant Examiner* — Jason Sheppard
(74) *Attorney, Agent, or Firm* — Keating & Bennett, LLP

(57) ABSTRACT

A secondary air supply device that increases a supply amount of secondary air is provided in a straddle-type vehicle and includes a plurality of secondary air supply pipes respectively communicated with an exhaust passage of an engine and reed valves. The plurality of reed valves are arranged to be spaced apart in the vehicle width direction so as to increase the supply amount of secondary air.

16 Claims, 6 Drawing Sheets

STRADDLE-TYPE VEHICLE

BACKGROUND OF THE INVENTION

1. Field of the Invention

The present invention relates to a straddle-type vehicle having a secondary air supply device arranged to supply secondary air to an exhaust passage of an engine.

2. Description of the Related Art

In some cases, a secondary air supply device which supplies secondary air to an exhaust passage of an engine is provided in a straddle-type vehicle. With the secondary air supply device, a one-way valve (a reed valve) is disposed at a secondary air supply pipe which is communicated with the exhaust passage. The secondary air is supplied to the exhaust passage by utilizing pulsation of exhaust pressure.

In Japanese Unexamined Patent Application No. 2006-183513, a secondary air supply device having a plurality of secondary air supply pipes is disclosed with the aim of increasing the supply amount of the secondary air. In the secondary air supply device, one-way valves disposed at each secondary air supply pipe are arranged to be aligned in the vehicle front-back direction.

However, in the case where a plurality of one-way valves are arranged to be aligned in the vehicle front-back direction as in Japanese Unexamined Patent Application No. 2006-183513, it becomes hard for the secondary air supply pipe to which the one-way valve of the rear side is attached to receive flowing air during traveling of the vehicle. Accordingly, the secondary air in the secondary air supply pipe is expanded due to heat from the engine side. Therefore, there is a problem that a substantial increase in the supply amount of the secondary air is difficult.

SUMMARY OF THE INVENTION

In order to overcome the problems described above, preferred embodiments of the present invention provide a straddle-type vehicle having a secondary air supply device that increases a supply amount of secondary air.

A straddle-type vehicle according to a preferred embodiment of the present invention includes at least a pair of front wheels which are aligned in the vehicle width direction, at least a pair of rear wheels which are aligned in the vehicle width direction, and a secondary air supply device arranged to supply secondary air to an exhaust passage of an engine, wherein the secondary air supply device includes a plurality of secondary air supply pipes which are communicated with the exhaust passage, respectively and one-way valves which are disposed at the plurality of secondary air supply pipes, respectively, wherein the plurality of one-way valves are arranged to be spaced apart from each other in the vehicle width direction.

According to a preferred embodiment of the present invention, since the plurality of one-way valves are arranged to be spaced apart from each other in the vehicle width direction, the secondary air supply pipes attached to each one-way valve receive flowing air easily during the traveling of the vehicle and cooling is accelerated. Therefore, a supply amount of the secondary air is substantially increased.

Usually, the exhaust passage is extended in the vehicle front-rear direction. Therefore, in the case that the plurality of secondary air supply pipes are communicated with the exhaust passage of the single-cylinder engine, the plurality of second air supply pipes normally tend to be aligned in the vehicle front-rear direction. On the contrary, in a preferred embodiment of the present invention, since the plurality of one-way valves are arranged to be spaced apart in the vehicle width direction, the plurality of secondary air supply pipes tend to be spaced apart in the vehicle width direction and easily receive flowing air. Here, the above-mentioned tendency that the plurality of secondary air supply pipes which are communicated with the exhaust passage tend to be aligned in the vehicle front-rear direction does not appear in the case that the secondary air supply pipes are communicated with each exhaust passage of a multi-cylinder engine. Therefore, the tendency is typical of a single-cylinder engine.

Further, since a preferred embodiment of the present invention provides a straddle-type vehicle which includes at least a pair of front wheels which are aligned in the vehicle width direction and at least a pair of rear wheels which are aligned in the vehicle width direction, the dimension in the vehicle width direction of the vehicle body is larger than that of a motorcycle. Therefore, the plurality of one-way valves can be arranged to be significantly spaced apart in the vehicle width direction.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention are explained with reference to the drawings.

Figure 1:
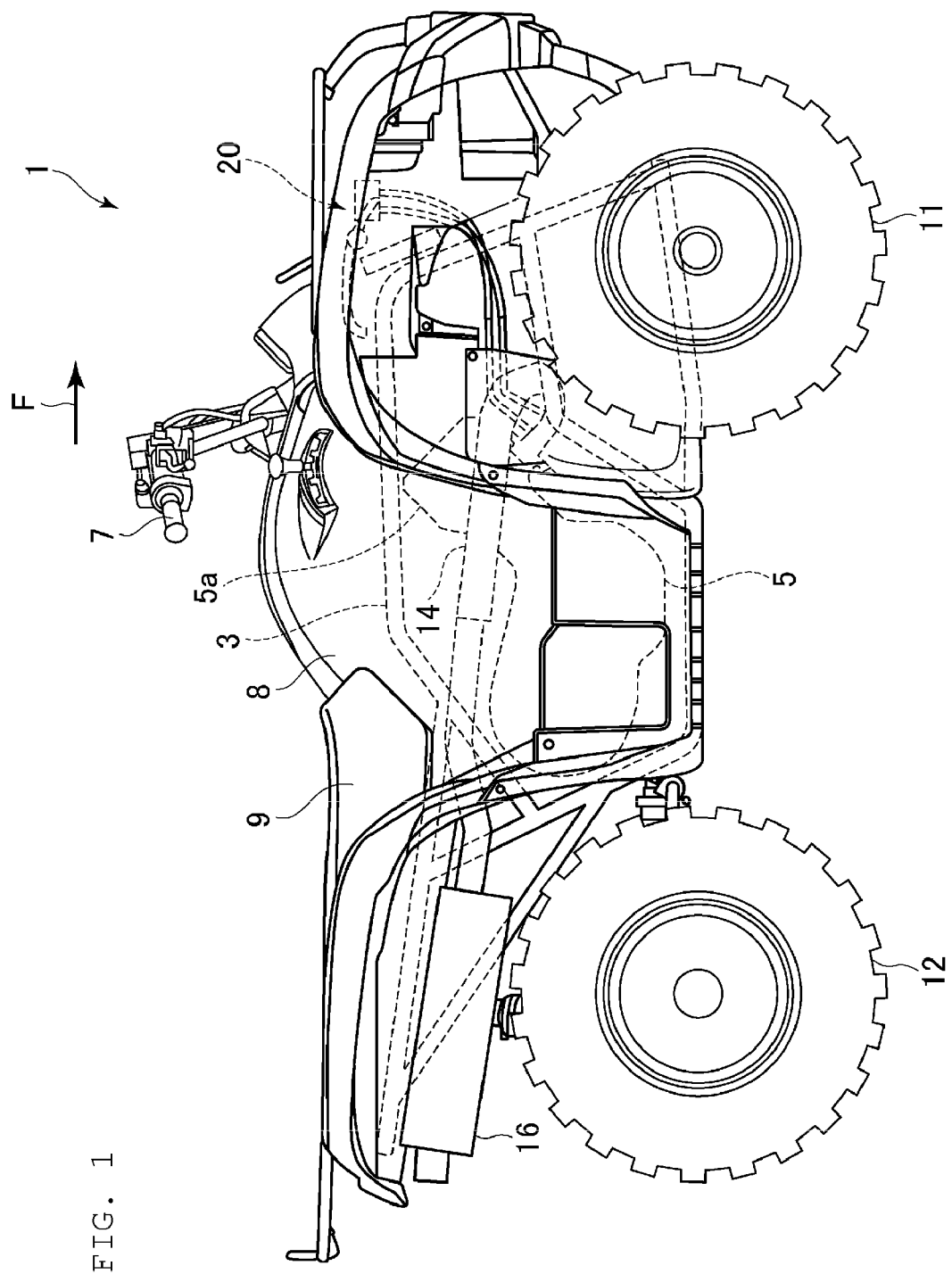
FIG. 1 is a side view of a straddle-type vehicle according to a preferred embodiment of the present invention.
Figure 2:
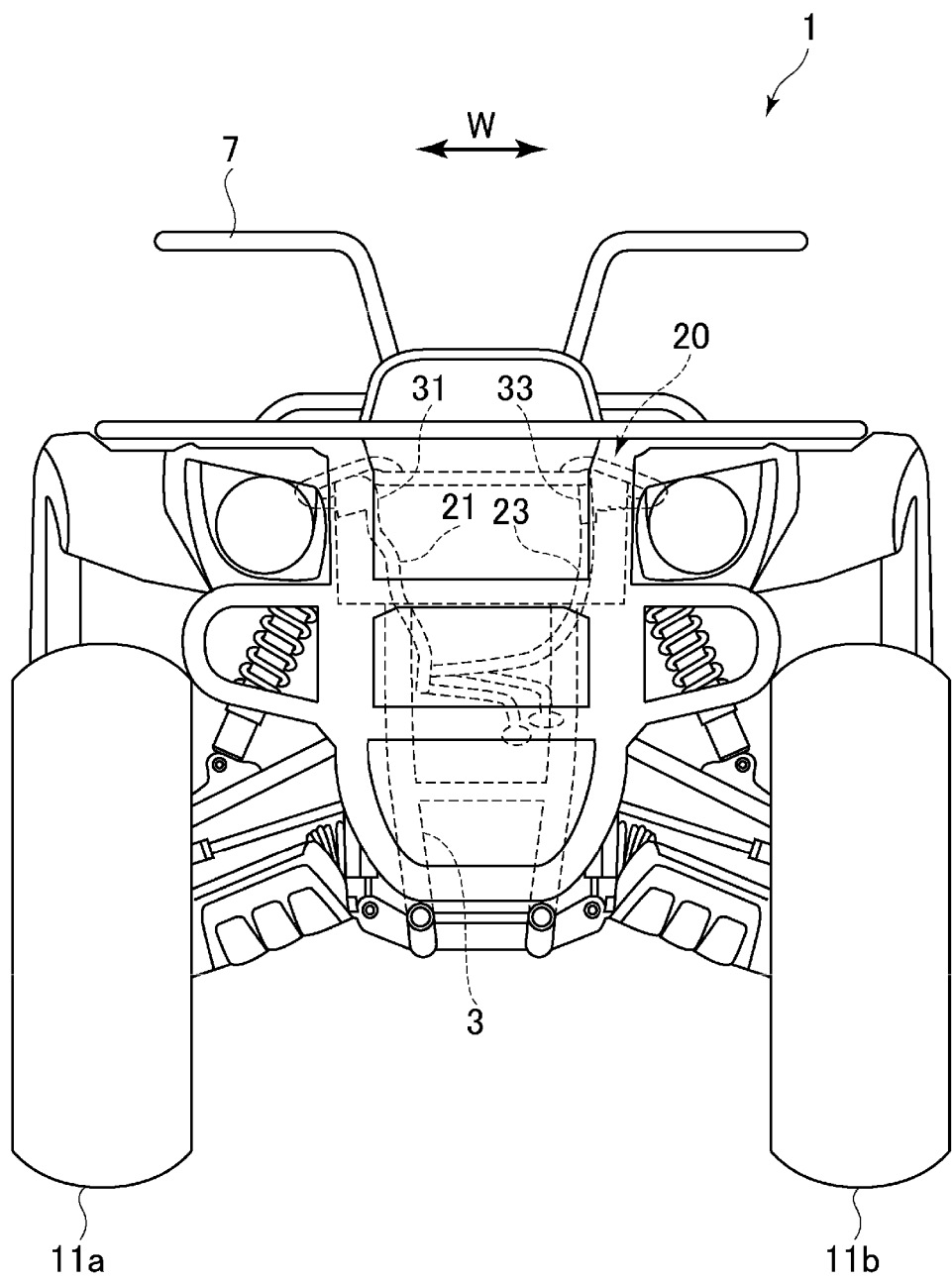
FIG. 2 is a front view of the straddle-type vehicle according to a preferred embodiment of the present invention.
Figure 3:
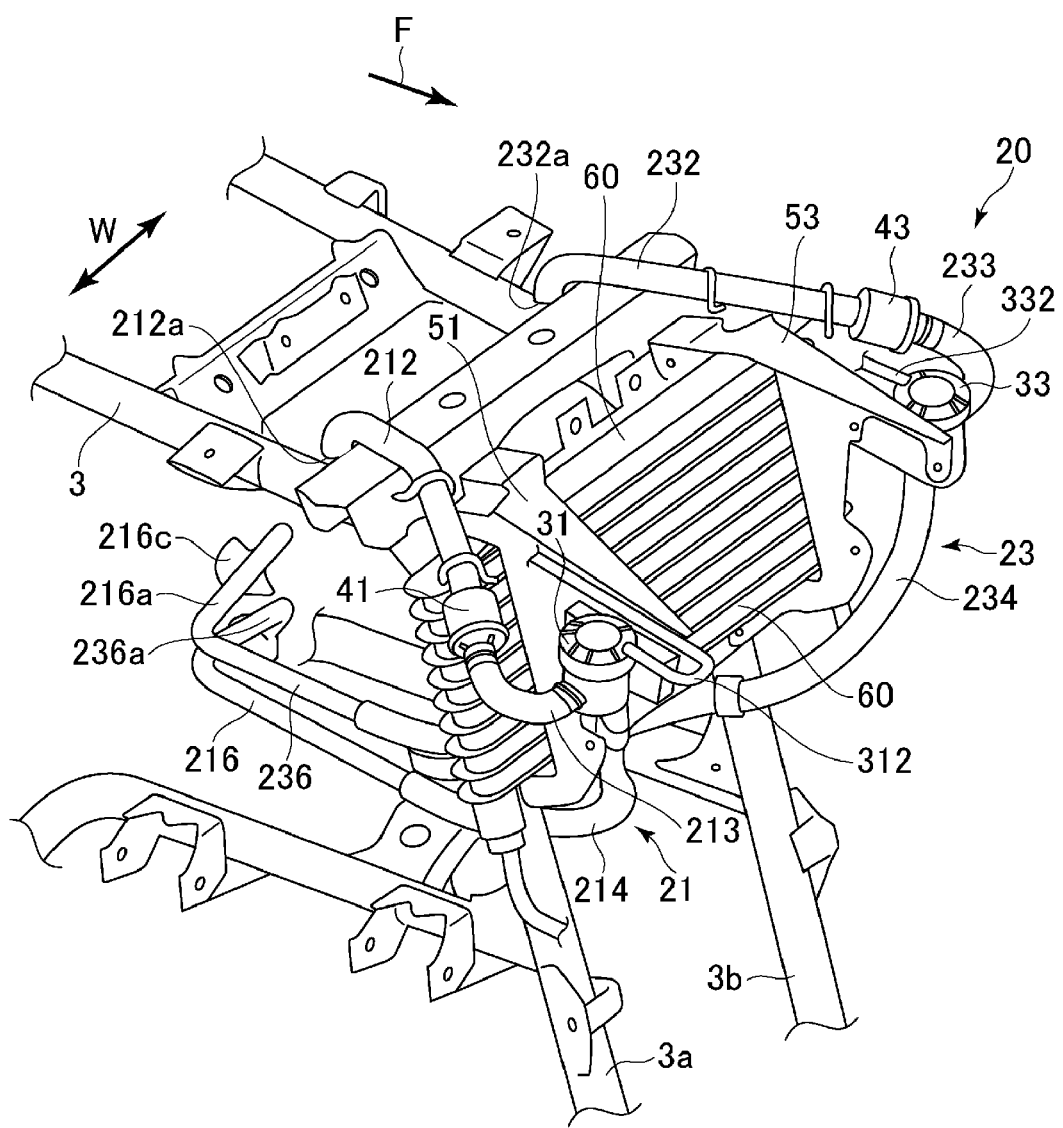
FIG. 3 is a perspective view for explaining a secondary air supply device.
Figure 4:
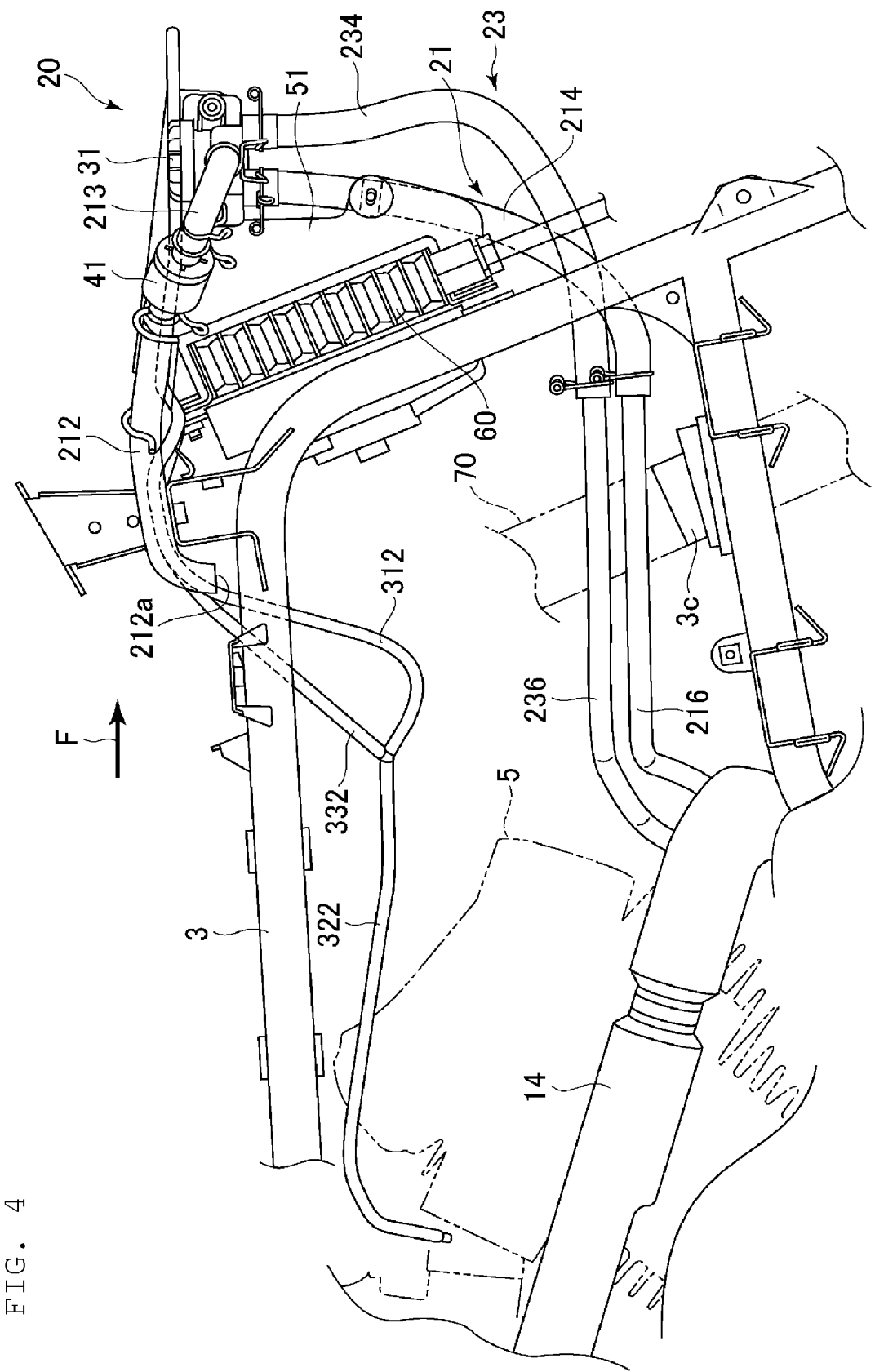
FIG. 4 is a side view for explaining the secondary air supply device.
Figure 5:
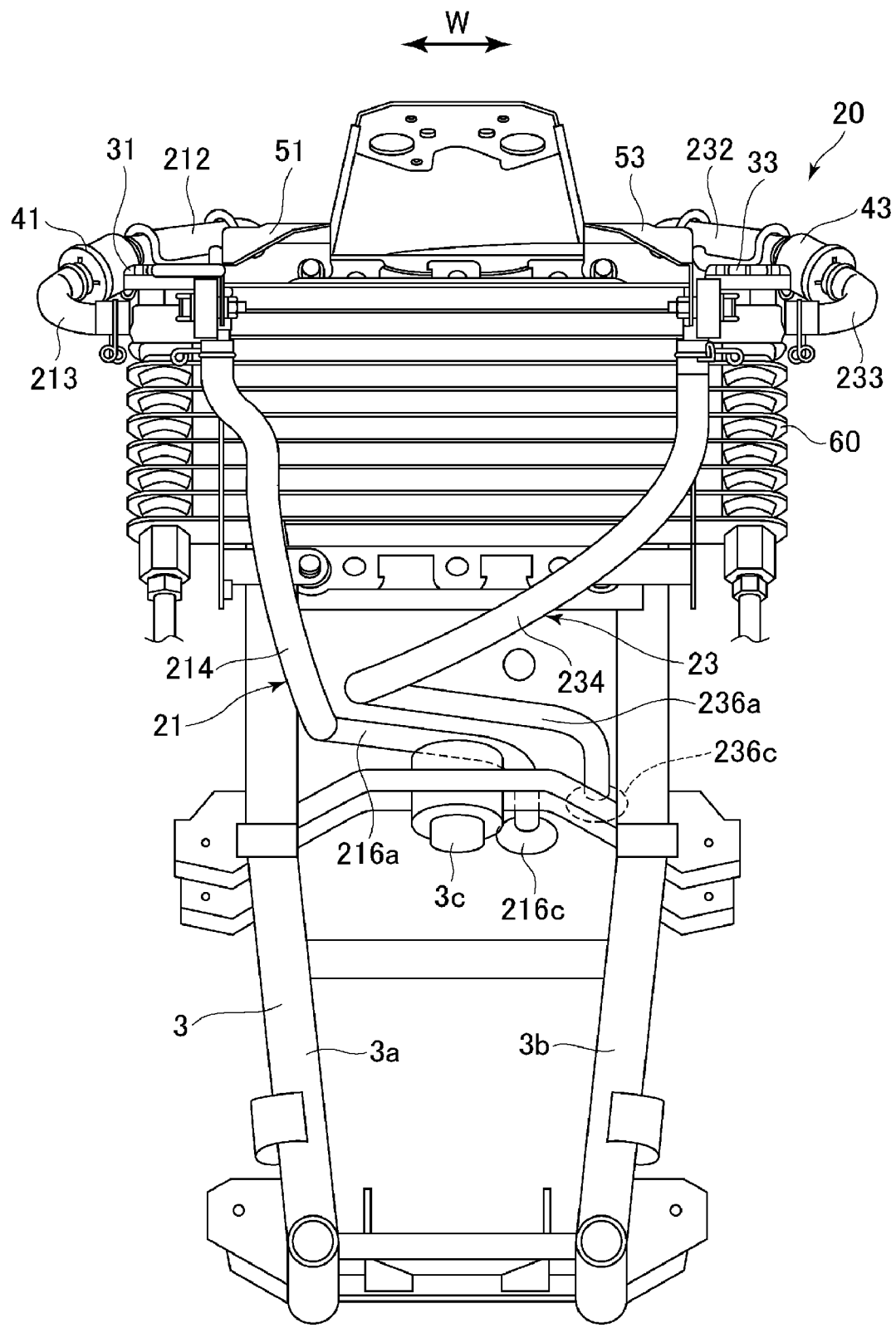
FIG. 5 is a front view for explaining the secondary air supply device.

FIG. 1 is a side view of a vehicle 1 which is an example of the straddle-type vehicle according to a preferred embodiment of the present invention. FIG. 2 is a front view of the vehicle 1. In these figures, the arrow F indicates the vehicle front side and the arrow W indicates the width direction of the vehicle. The vehicle 1 preferably is a vehicle which can travel on rough terrain and is called an ATV (All Terrain Vehicle).

A single-cylinder engine 5 is mounted at the center portion of a double-cradle type vehicle frame 3 of the vehicle 1. A steering handle 7, a fuel tank 8 and a straddle-type seat 9 are disposed in such order at the upper portion of the vehicle frame 3 from the front side. Further, at the lower portion of the vehicle frame 3, two front wheels 11 are disposed at the front side and two rear wheels 12 are disposed at the rear side.

The engine 5 is supported by the vehicle frame 3 so that a cylinder head 5a is located at the front side in a posture that a cylinder axis is slightly inclined frontward. An exhaust pipe 14 is connected to an exhaust port which is disposed at the front portion of the cylinder head 5a. The exhaust pipe 14 is extended toward the rear side of the vehicle and a muffler 16 is connected to the rear end portion thereof.

A secondary air supply device (SAS: Secondary Air Supply) 20 arranged to supply secondary air to the exhaust passage which preferably includes the exhaust pipe 14 and the muffler 16 of the engine 5, is provided in the vehicle 1.

FIG. 3 through FIG. 6 are respectively a perspective view, a side view, a front view and a plane view for explaining the secondary air supply device 20. The secondary air supply device 20 preferably has two secondary air supply pipes 21, 23 which are respectively communicated with the exhaust pipe 14. Reed valves (one-way valves) 31, 33 are respectively disposed at some midpoint of the secondary air supply pipes 21, 23.

The secondary air supply device 20 inhales atmospheric air from suction ports 212a, 232a which are respectively disposed at one end of the secondary air supply pipes 21, 23 and feeds the air as the secondary air into the exhaust pipe 14 which is connected to the other end. At that time, backflow of the secondary air in the secondary air supply pipes 21, 23 are prevented by the reed valves 31, 33.

The reed valves 31, 33 are aligned in the vehicle width direction being supported respectively by brackets 51, 53 at the front side of a plate-shaped oil cooler 60 which cools lubricating oil in the engine 5, which is attached to the front side of the vehicle frame 3. The bifurcated base end portions of the brackets 51, 53 are attached to the vehicle frame 3 along with the oil cooler 60. Then, the brackets 51, 53 respectively support the reed valves 31, 33 with each top end portion which extends toward the front side of the vehicle. Here, the reed valves 31, 33 are arranged to be separated and located at both sides sandwiching the center of the vehicle width direction and to overlap with each other in the side view.

The secondary air supply pipe 21 which is attached to the reed valve 31 which is located at the right side in the vehicle width direction has a metal pipe 212 and a rubber tube 213 as a flow passage forming member of the upstream side which forms the flow passage from the atmosphere to the reed valve 31. Further, a filter 41 is arranged between the metal pipe 212 and the rubber tube 213. Similarly, the secondary air supply pipe 23 which is attached to the reed valve 33 which is located at the left side in the vehicle width direction has a metal pipe 232 and a rubber tube 233 as the flow passage forming member of the upstream side which forms the flow passage from the atmosphere to the reed valve 33. Further, a filter 43 is arranged between the metal pipe 232 and the rubber tube 233.

The flow passage forming members of the upstream side are respectively extended toward the outside in the vehicle width direction from the reed valves 31, 33, and then, are bent and extended toward the rear side of the vehicle while gradually narrowing the space therebetween.

Specifically, the front end portions of the rubber tubes 213, 233 are respectively attached to the reed valves 31, 33 at the side portion of the outside thereof in the vehicle width direction. The rubber tubes 213, 233 are bent to be an arc shape to the rear side of the vehicle and the rear end portions thereof are respectively attached to the filters 41, 43. Further, the front end portions of the metal pipes 212, 232 are respectively attached to the filters 41, 43. Then, the metal pipes 212, 232 are extended toward the rear side of the vehicle while gradually getting closer to the center in the vehicle width direction. Further, the suction ports 212a, 232a which are open downward are respectively arranged at the end portions of the metal pipes 212, 232.

On the other hand, the secondary air supply pipe 21 which is attached to the reed valve 31 which is located at the right side in the vehicle width direction has a rubber tube 214 and a metal pipe 216 as the flow passage forming member of the downstream side which forms the flow passage from the reed valve 31 to the abovementioned exhaust pipe 14. Similarly, the secondary air supply pipe 23 which is attached to the reed valve 33 which is located at the left side in the vehicle width direction has a rubber tube 234 and a metal pipe 236 as the flow passage forming member of the downstream side which forms the flow passage from the reed valve 33 to the abovementioned exhaust pipe 14.

The flow passage forming members of the downstream side are respectively extended downward from the reed valves 31, 33, and then, extended toward the rear side of the vehicle after passing between a right side frame 3a and a left side frame 3b which structure the vehicle frame 3 being inclined downward from the reed valves 31, 33 to the abovementioned exhaust pipe 14.

Specifically, the top end portions of the rubber tubes 214, 234 are respectively attached to the lower portions of the reed valves 31, 33. Then, the bottom end portions of the rubber tubes 214, 234 reach the rear-lower side of the oil cooler 60 while forming a gradual curve. Here, the rubber tube 234 is extended to the right side in the vehicle width direction from the left side where the reed valve 33 is located and reaches the vicinity of the other rubber tube 214.

Further, the metal pipes 216, 236 are respectively attached to the bottom end portions of the rubber tubes 214, 234 and extended toward the rear side of the vehicle. Here, the metal pipes 216, 236 are extended toward the rear side of the vehicle passing through the right side in the vehicle width direction of a steering shaft 70 (see FIG. 4) which is inserted to the insertion member 3c which is disposed at the vehicle frame 3.

Further, the metal pipes 216, 236 are bent at the rear side of the steering shaft 70 and extended to the vicinity of the center along the vehicle width direction. Then, the metal pipes 216, 236 are bent obliquely rearward and downward and reach the connecting portions 216c, 236c which are connected to the exhaust pipe 14. Here, the portions 216a, 236a of the metal pipes 216, 236, which are extended in the vehicle width direction are extended in the state to be spaced apart from each other in the vertical direction.

In addition, the reed valves 31, 33 also include the structure as an air cut valve. Tubes 312, 332 which are respectively connected to the reed valves 31, 33 are extended toward the rear side of the vehicle and connected to the intake passage of the engine 5 via a tube 322 (see FIG. 4). Accordingly, the reed valves 31, 33 suppress the amount of secondary air which is supplied to the exhaust pipe 14 by utilizing negative pressure generated at the intake passage in a condition where the throttle valve is closed.

In the present preferred embodiment which is explained above, the reed valves 31, 33 are preferably arranged to be aligned in the vehicle width direction. Accordingly, the reed valves 31, 33 and the secondary air supply pipes 21, 23 receive flowing air easily during the traveling of the vehicle and cooling is accelerated. Consequently, the supply amount of the secondary air can be substantially increased.

Further, in the present preferred embodiment, the reed valves 31, 33 are preferably arranged at both sides sandwiching the center of the vehicle width direction. Accordingly, cooling of the reed valves 31, 33 and the secondary air supply pipes 21, 23 is accelerated and the secondary air supply pipes 21, 23 can be arranged to be separated from each other in the right and left in the vehicle width direction.

Further, in the present preferred embodiment, the reed valves 31, 33 are arranged closer to the front side of the vehicle than the engine 5. Accordingly, atmospheric air heated by the engine 5 is prevented from flowing to the reed valves 31, 33 and the secondary air supply pipes 21, 23.

Further, in the present preferred embodiment, the reed valves 31, 33 are preferably arranged closer to the front side of the vehicle than the vehicle frame 3. Accordingly, it becomes easy for the reed valves 31, 33 and the secondary air supply pipes 21, 23 to receive flowing air during traveling of the vehicle.

Further, in the present preferred embodiment, the reed valves 31, 33 are preferably arranged closer to the front side of the vehicle than the oil cooler 60. Accordingly, atmospheric air heated by the oil cooler 60 is prevented from flowing to the reed valves 31, 33 and the secondary air supply pipes 21, 23.

Further, in the present preferred embodiment, the reed valves 31, 33 are preferably arranged between two front wheels 11a, 11b, as shown in FIG. 2. Accordingly, the reed valves 31, 33 and the secondary air supply pipes 21, 23 are arranged to receive flowing air during traveling of the vehicle without being disturbed by the front wheels 11a, 11b.

Further, in the secondary air supply pipes 21, 23 of the present preferred embodiment, the flow passage forming members which are disposed at the upstream side of the reed valves 31, 33 preferably are each separate structures. Accordingly, compared with the case where the flow passage forming members are integral and have a common suction port, an intake amount of atmospheric air is increased.

Further, in the secondary air supply pipes 21, 23 of the present preferred embodiment, the flow passage forming members which are preferably disposed at the upstream side of the reed valves 31, 33 are extended from the reed valves 31, 33 to the rear side of the vehicle so that the suction ports 212a, 232a are located further rearward. Accordingly, cleaner atmospheric air can be inhaled.

Further, in the present preferred embodiment, the reed valves 31, 33 are arranged above the connecting portions 216c, 236c of the secondary air supply pipes 21, 23 which are connected to the exhaust pipe 14. In addition, the flow passage forming members of the secondary air supply pipes 21, 23 as a whole which are arranged at the downstream side of the reed valves 31, 33 are preferably inclined downward from the reed valves 31, 33 toward the connecting portions 216c, 236c. Here, the downward inclination may include a horizontal part. More specifically, the flow passage forming members of the downstream side do not include a portion which is inclined upward at any midpoint of the portion extending toward the connecting portions 216c, 236c. Therefore, even in the case where the exhaust gas in the exhaust pipe 14 flows into the secondary air supply pipes 21, 23 and moisture which is contained in the exhaust gas is condensed, it is possible to prevent the moisture from staying in the secondary air supply pipes 21, 23.

Further, in the present preferred embodiment, the metal pipes 216, 236 connected to the exhaust pipe 14 have portions 216a, 236a which are extended along the vehicle width direction at some midpoint. Accordingly, these portions 216a, 236a are easy to receive flowing air during traveling of the vehicle and cooling is accelerated. Therefore, it is easy to prevent heat transmission from the exhaust pipe 14 side to the upstream side of the secondary air supply pipes 21, 23.

Further, in the present preferred embodiment, the portions 216a, 236a of the metal pipes 216, 236 which are extended along the vehicle width direction are preferably arranged to be spaced apart in the vertical direction. Accordingly, it becomes easier for these portions 216a, 236a to receive flowing air and cooling is more accelerated.

Figure 6:
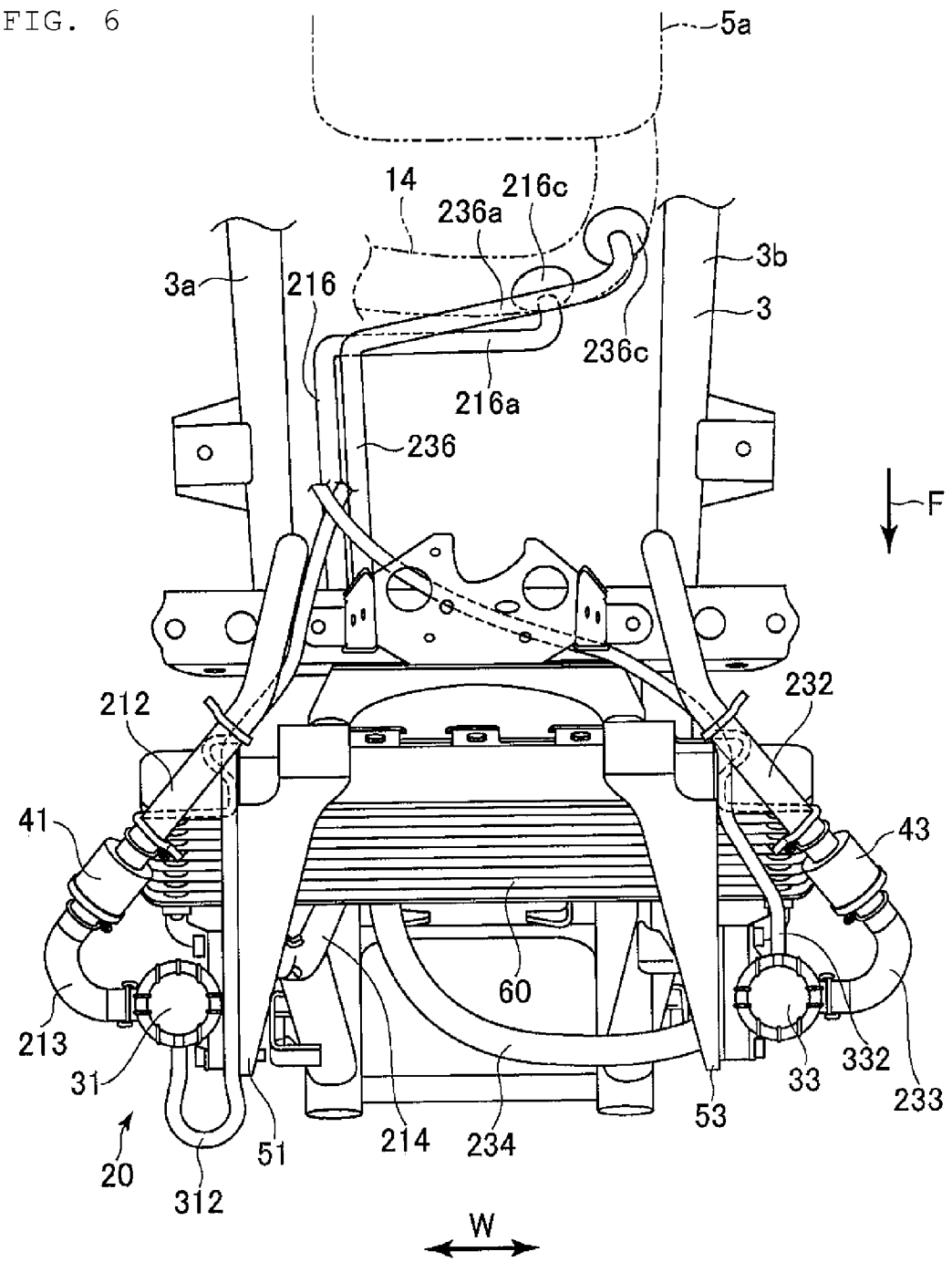
FIG. 6 is a plane view for explaining the secondary air supply device.

Further, in the present embodiment, the portions of the exhaust pipe 14 to which the secondary air supply pipes 21, 23 are connected are preferably arranged closer to the front side of the vehicle than the engine 5, as illustrated in FIG. 6. Therefore, atmospheric air heated by the engine 5 can be prevented from flowing to the secondary air supply pipes 21, 23.

Further, in the present preferred embodiment, the portions of the exhaust pipe 14 to which the secondary air supply pipes 21, 23 are connected are extended in the vehicle width direction and the connecting portions 216c, 236c of the secondary air supply pipes 21, 23 are connected to the portions so as to be aligned in the vehicle width direction, as illustrated in FIG. 6. Accordingly, since both the connecting portions 216c, 236c easily receive flowing air, cooling thereof is accelerated.

In the above, a preferred embodiment of the present invention is explained. However, the present invention is not limited to the configuration of the abovementioned preferred embodiment. For example, it is also possible to attach the secondary air supply pipes 21, 23 to the cylinder head 5a of the engine 5 and to supply secondary air to the exhaust passage in the cylinder head 5a (the passage toward the exhaust port).

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A vehicle comprising:
an engine having an exhaust passage including a single exhaust pipe;
at least a pair of front wheels aligned in a vehicle width direction;
at least a pair of rear wheels aligned in the vehicle width direction; and
a secondary air supply device arranged to supply secondary air to the single exhaust pipe; wherein
the secondary air supply device includes a plurality of secondary air supply pipes arranged to supply the secondary air directly to the single exhaust pipe and a plurality of one-way valves which are disposed at the plurality of secondary air supply pipes, respectively;
the plurality of one-way valves are spaced apart from each other in the vehicle width direction; and
a portion of each of the secondary air supply pipes is made of a metal material, and none of the portions of the secondary air supply pipes which are made of the metal material overlap as seen in a front view of the vehicle.

2. The vehicle according to claim 1, wherein the plurality of one-way valves are aligned in the vehicle width direction.

3. The vehicle according to claim 1, wherein the plurality of one-way valves are arranged on both sides of a central portion of the vehicle in the vehicle width direction.

4. The vehicle according to claim 1, wherein at least one of the plurality of one-way valves is arranged closer to the front side of the vehicle than the engine.

5. The vehicle according to claim 1, wherein the engine is a single-cylinder engine.

6. The vehicle according to claim 1, further comprising a vehicle frame arranged to support the front wheels, the rear wheels and the engine, wherein at least one of the plurality of one-way valves is arranged closer to the front side of the vehicle than the vehicle frame.

7. The vehicle according to claim 1, wherein at least one of the plurality of one-way valves is arranged closer to the front side of the vehicle than an oil cooler arranged to cool lubricating oil in the engine.

8. The vehicle according to claim 1, wherein at least one of the plurality of one-way valves is arranged between the plurality of front wheels.

9. The vehicle according to claim 1, further comprising flow passage defining members disposed at an upstream side of each of the one-way valves and arranged to connect between an outside atmosphere and the one-way valves.

10. The vehicle according to claim 9, wherein at least one of the plurality of flow passage defining members extends from a respective one of the one-way valves to a rear of the vehicle.

11. The vehicle according to claim 1, wherein at least one of the plurality of one-way valves is arranged above a connecting portion of the secondary air supply pipe to which the at least one of the plurality of one-way valves is connected for connecting to the single exhaust pipe, and a member of the secondary air supply pipe as a whole which is arranged farther downstream than the at least one of the plurality of one-way valves is inclined downward from the at least one of the plurality of one-way valves toward the connecting portion.

12. The vehicle according to claim 1, wherein at least a portion of the portions of the secondary air supply pipes which are made of the metal material extend in the vehicle width direction.

13. The vehicle according to claim 12, wherein the portions which are made of the metal material are arranged so that at least some portions thereof are spaced apart in a vertical direction of the vehicle.

14. The vehicle according to claim 1, wherein portions of the single exhaust pipe to which the plurality of secondary air supply pipes are connected are arranged closer to a front of the vehicle than the engine.

15. The vehicle according to claim 1, wherein portions of the single exhaust pipe to which the plurality of secondary air supply pipes are connected are extended in the vehicle width direction and connecting portions of the plurality of secondary air supply pipes are connected to the portions of the single exhaust pipe so as to be aligned in the vehicle width direction.

16. The vehicle according to claim 1, wherein the vehicle is a straddle-type vehicle.

* * * * *